US008179082B2

(12) United States Patent
Li et al.

(10) Patent No.: US 8,179,082 B2
(45) Date of Patent: May 15, 2012

(54) SOFT STARTING METHOD AND SYSTEM THEREOF IN THE WAY OF WAVE-SKIPPING WITH STEPPED FREQUENCY AND STEPLESS VOLTAGE REGULATING FOR A MOTOR

(75) Inventors: Xing Li, Liaoning (CN); Qiang Zuo, Liaoning (CN); Yingsheng Xu, Liaoning (CN); Mingqi Si, Liaoning (CN)

(73) Assignee: Rongxin Power Electronics Co., Ltd, Liaoning (CN)

( * ) Notice: Subject to any disclaimer, the term of this patent is extended or adjusted under 35 U.S.C. 154(b) by 829 days.

(21) Appl. No.: 12/225,864

(22) PCT Filed: Jul. 24, 2007

(86) PCT No.: PCT/CN2007/002244
§ 371 (c)(1),
(2), (4) Date: Oct. 1, 2008

(87) PCT Pub. No.: WO2008/014681
PCT Pub. Date: Feb. 7, 2008

(65) Prior Publication Data
US 2009/0267552 A1    Oct. 29, 2009

(30) Foreign Application Priority Data
Jul. 26, 2006    (CN) .......................... 2006 1 0047311

(51) Int. Cl.
*H02P 1/16*    (2006.01)
*H02P 1/30*    (2006.01)
(52) U.S. Cl. .................... 318/778; 318/430; 323/238
(58) Field of Classification Search .................. 318/778, 318/779, 727, 809, 430; 323/238, 321, 901
See application file for complete search history.

(56) References Cited

U.S. PATENT DOCUMENTS
4,070,605 A * 1/1978 Hoeppner ................... 318/758
(Continued)

FOREIGN PATENT DOCUMENTS
CN    1599230    3/2005
(Continued)

OTHER PUBLICATIONS
Translation: She, Zhiting, et al., "Study of high Torque Softstarter Based on Discrete Frequeny", Journal of Hunan University (Natural Sciences), Dec. 2004, vol. 31, No. 6, pp. 46-50.*
International Search Report.
She, Zhiting, et al., "Study of high Torque Softstarter Based on Discrete Frequency", Journal of Hunan University (Natural Sciences), Dec. 2004, vol. 31, No. 6, pp. 46-50.

(Continued)

Primary Examiner — Eduardo Colon
(74) Attorney, Agent, or Firm — Smith, Gambrell & Russell, LLP

(57) ABSTRACT

The invention relates to a soft starting method and system thereof in the way of wave-skipping with stepped frequency and stepless voltage regulating for a motor which can be applied to the large torque starting of AC motor under the condition of a power supply of a industrial frequency supply source and the safe starting of higher load. Trigger signals generated by a control system, in the soft starting method of the invention, act on five sets of anti-parallel thyristor valves connected between the power supply and the motor to conduct a pair of thyristors thereof according to a set frequency and sequence, and the motor is started from a standstill status to full speed in the way of wave-skipping by controlling the sets of the thyristor valves. The method may improve the starting torque for more than 10 times of the traditional motor soft starting of the voltage reduction and control the starting current for about two times of the rated current. The cost thereof is only 20-25% of similar frequency converter.

9 Claims, 3 Drawing Sheets

U.S. PATENT DOCUMENTS

| | | | | |
|---|---|---|---|---|
| 4,482,853 A | * | 11/1984 | Bhavsar | 318/778 |
| 5,008,608 A | * | 4/1991 | Unsworth et al. | 318/729 |
| 5,151,642 A | * | 9/1992 | Lombardi et al. | 318/779 |
| 6,420,848 B1 | * | 7/2002 | Gritter et al. | 318/778 |
| 6,870,333 B2 | * | 3/2005 | Griepentrog et al. | 318/257 |
| 7,345,449 B2 | * | 3/2008 | Barie et al. | 318/779 |
| 2003/0146722 A1 | * | 8/2003 | Griepentrog et al. | 318/257 |
| 2007/0046247 A1 | * | 3/2007 | Barie et al. | 318/799 |

FOREIGN PATENT DOCUMENTS

| | | |
|---|---|---|
| CN | 1889354 | 1/2007 |
| JP | 2001-37274 | 2/2001 |

OTHER PUBLICATIONS

Written Opinion of the International Search Authority, issued in PCT/CN2007/002244, Oct. 17, 2007.

\* cited by examiner

SOFT STARTING METHOD AND SYSTEM THEREOF IN THE WAY OF WAVE-SKIPPING WITH STEPPED FREQUENCY AND STEPLESS VOLTAGE REGULATING FOR A MOTOR

FIELD OF THE INVENTION

The present invention relates to a stepped soft starting method with large-torque for an AC Motor which can be applied to the large torque starting of an AC motor under the condition of a power supply of a standard industrial frequency supply source and the safe starting of an AC motor under a condition of high load.

BACKGROUND OF THE INVENTION

The solid-state starting device of AC motors, in the prior art, adopts a starting method through anti-parallel thyristor bidirectional valves which can decrease the voltage applied to the motor. Due to the square of the voltage being directly proportional to the torque of the motor, the starting torque is very small but the impact current is very strong, normally being controlled at 4-6 times of the rated current of the motor, which can easily result in abnormal operation occurring, such as block-up or unsuccessful starting. In addition, use of such conventional adjustable-speed equipment is very costly.

SUMMARY OF THE INVENTION

To solve the technical problem in the prior art, the present invention provides a soft starting method and system in the way of wave-skipping with stepped frequency and stepless voltage regulating for a motor which can improve the starting torque of the motor by more than 10 times that of traditional motor soft starting technologies through voltage reduction, and control the starting current to be at about two times of the rated current. In addition, the cost is only 20-25% as that of a similar frequency converter.

In order to realize the above-mentioned benefits, the technical program of the invention is as follows:

The soft starting method in the way of wave-skipping with stepped frequency and stepless voltage regulating for the motor includes: trigger signals generated by a control system acting on sets of anti-parallel thyristor valves connected between the power supply and the motor to conduct a pair of thyristors thereof according to a set frequency and a set sequence, and the motor is started from a standstill status to full speed in the way of wave-skipping by controlling the sets of the thyristor valves to realize the maximum torque of the motor and make the motor complete the starting from a static state to full speed.

The said frequency and sequence can be set such that: three half-waves in every waveform of 4 half-waves are selectively removed, and 3 of 4 half-waves in every waveform of the supply source are selectively removed, by means of ½f trigger signal, resulting in the fundamental wave frequency of the voltage and current of the motor being ½ of the power frequency, that is 25 Hz, so as to make the rotation speed of the motor increasing in full speed from ¼ to realize the starting of the motor from 12.5 Hz to 25 Hz. All of the half-waves will be applied to the motor through the trigger signal of the power frequency so as to result in the rotation speed thereof increasing in full speed from ½ times to realize the starting from 25 Hz-50 Hz. A method of half-wave removed selection is: dividing a cluster of 6 trigger signals from the control system into 3 groups respectively connecting the sets of valves of an actuator, wherein each set of valves is of two signals at the same time and the starting points of the signals from the adjoining two groups are at intervals of ⅔ times rated cycle. Conduction will be made in accordance with the following sequences: the $1^{st}$ set of valves is positive conduction and the $5^{th}$ set of valves is opposite conduction simultaneously; the $4^{th}$ set of valves is positive conduction and the $1^{st}$ set of valves is opposite conduction simultaneously; the $5^{th}$ set of valves is positive conduction and the $4^{th}$ set of valves is opposite conduction simultaneously, resulting in the fundamental wave frequency of AC voltage at the output end being ½ of the rated frequency.

The said frequency and sequence can also be set with three steps as follow:

Step 1: while starting, 7 of the 8 half-waves in every waveform of the supply source will be selectively removed by means of the ¼f trigger signal resulting in the fundamental wave of the voltage of the motor being ¼ of the power frequency (i.e. 12.5 Hz), and the voltage steadily increasing to ¼ rated voltage, this brings about the motor starting from 0 Hz to 12.5 Hz.

Step 2: 3 of 4 half-waves in every waveform of the supply source are selectively removed, by means of ½f trigger signal, resulting in the fundamental wave frequency of the voltage and current of the motor being ½ of the power frequency, that is 25 Hz, to make the rotation speed of the motor increase in full speed from ¼ to realize the starting of the motor from 12.5 Hz to 25 Hz.

Step 3: all of the half-waves will be applied to the motor, through the trigger signal of the power frequency, resulting in the rotation speed thereof increasing in full speed from ½ times to realize the starting from 25 Hz-50 Hz.

A method of half-wave removed selection is with the following two steps:

Step 1: a cluster of 6 trigger signals from the control system is divided into 3 groups respectively connecting the sets of valves of the actuator, wherein each set of valves has two signals at the same time and the starting points of the signals from the adjoining two groups are at intervals of ⅘ times rated cycle. Conduction will be made in accordance with the following sequences: the $1^{st}$ set of valves is positive conduction and the $3^{rd}$ set of valves is opposite conduction simultaneously; the $2^{nd}$ set of valves is positive conduction and the $1^{st}$ set of valves is opposite conduction simultaneously; the $3^{rd}$ set of valves is positive conduction and the $2^{nd}$ set of valves is opposite conduction simultaneously, resulting in the fundamental wave frequency of AC voltage at the output end being ¼ of the rated frequency.

Step 2: a cluster of 6 trigger signals from the control system is divided into 3 groups respectively connecting the sets of valves of the actuator, wherein each set of valves has two signals at the same time and the starting points of the signals from the adjoining two groups are at intervals of ⅔ times rated cycle. Conduction will be made in accordance with the following sequences: the $1^{st}$ set of valves is positive conduction and the $5^{th}$ set of valves is opposite conduction simultaneously; the $4^{th}$ set of valves is positive conduction and the $1^{st}$ set of valves is opposite conduction simultaneously; the $5^{th}$ set of valves is positive conduction and the $4^{th}$ set of valves is opposite conduction simultaneously, resulting in the fundamental wave frequency of AC voltage at the output end being ½ of the rated frequency.

The system used for the soft starting method in the way of wave-skipping with stepped frequency and stepless voltage regulating for the motor includes two parts of an actuator and a control device, wherein the actuator is a structure with sets of thyristor valves, wherein each two thyristors from the sets of thyristor valves forms an anti-parallel group connecting between the power supply and the motor.

The number of the thyristor groups in the sets of valves is of 3 or 5. If the number of the thyristor groups is 3, the connecting structure is of a form wherein: the $1^{st}$ set of valves is connected between the power network and the motor through the $1^{st}$ input end and the $1^{st}$ output end; the $2^{nd}$ set of valves is connected between the power network and the motor through the $2^{nd}$ input end and the $2^{nd}$ output end; the $3^{rd}$ set of valves is connected between the power network and the motor through the $3^{rd}$ input end; and the $3^{rd}$ output end. If the number of the thyristor groups in the sets of valves is 5, the connecting structure is of a form wherein: the $1^{st}$ set of valves is connected between the power network and the motor through the $1^{st}$ input end and the $1^{st}$ output end; the $2^{nd}$ set of valves is connected between the power network and the motor through the $2^{nd}$ input end and the $2^{nd}$ output end; the $3^{rd}$ set of valves is connected between the power network and the motor through the $3^{rd}$ input end and the $3^{rd}$ output end; the $4^{th}$ set of valves is connected between the $3^{rd}$ input end and the $2^{nd}$ output end; and the $5^{th}$ set of valves is connected between the $2^{nd}$ input end and the $3^{rd}$ output end.

The control device consists of a micro-controller, a phase-shifting circuit and a programmable logical circuit. The phase-shifting circuit receives the synchronizing signals and its output end is linked to the micro-controller by a zero-crossing detection circuit to transmit the synchronizing signals after 90 degree phase-shifting. The output end of the micro-controller forwards the controlled trigger signals to the gate of the thyristors mounted in the frequency conversion starting device through the programmable logical circuit respectively; the micro-controller also links to a display circuit, a command input, a communication interface and a current regulating circuit.

Compared with traditional technology the soft starting method and its system in the way of wave-skipping with stepped frequency and stepless voltage regulating for the motor in this invention has the following novelty and inventiveness:

1. The starting of the motor can realize stepless regulation for the output voltage by the thyristors. Output voltage frequency can be altered by using the soft starting method of the present invention. Magnetic flux of the motor can reach approximately the rated value at points of ¼f, ½f and if by means of stepless changing of the input voltage amplitude and stepped changing of the input frequency of voltage applied to the motor. As such, the starting torque of the motor approximates the rated torque at the said 3 points, and is over 10 times that of the starting torque of traditional high-voltage soft starting technologies, and the starting current can be controlled at about 2 times of the rated current in the whole starting period as well.

The method may improve the starting torque by more than 10 times that of the traditional motor soft starting technologies through the voltage reduction, achieving up to 80-90% of the rated torque at ¼f and ½f points, and controlling the starting current at about two times of the rated current. In addition, the cost is only 20-25% of similar frequency converter technologies (obtained through sets of valves in this invention).

2. The starting mode is flexible and different starting frequency combinations can be selected in accordance with the on-site loading and power network conditions. The stepped frequency conversion mode can realize various starting modes such as voltage gradient starting, current-limit starting, and etc., under different starting frequencies.

3. The starting of the motor can be flexibly controlled. There are three kinds of modes to stop the motor (i.e. free stop, soft stop and braking stop).

4. Many communication interfaces may be realized by adopting a digital control mode (using the control device for example) for easily networking.

5. This method can also be used at sites where the stepped speed regulating operation has requirements of ¼ rated rotation speed and ½ rated rotation speed.

DESCRIPTION OF THE INVENTION IN DETAIL

Example 1

Figure 1:
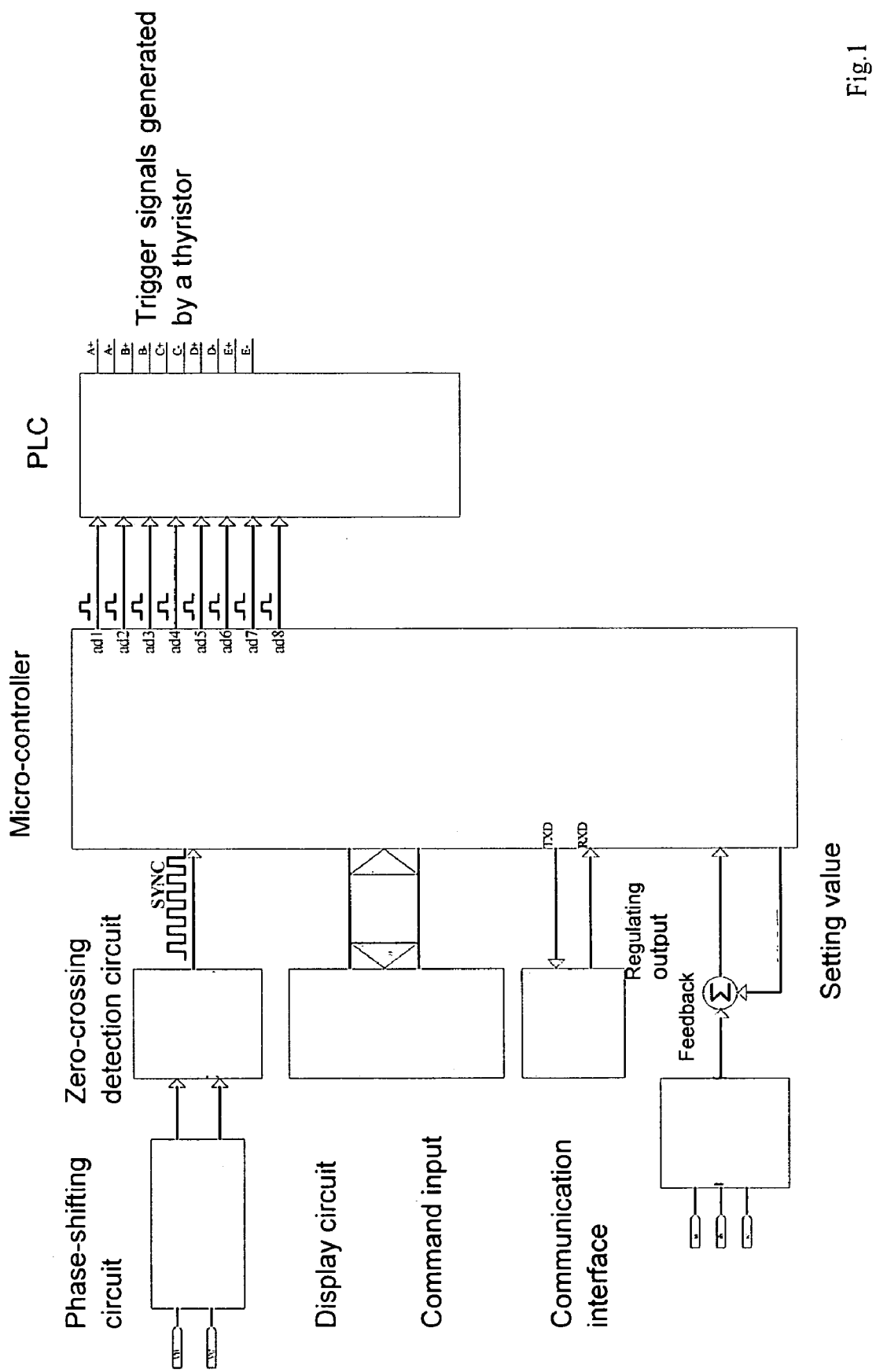
FIG. 1 is a schematic circuit of a control system.

The method of the present invention is: trigger signals generated by a control system act on five sets of anti-parallel thyristor valves connected between the power supply and the motor to conduct a pair of thyristors thereof according to a set frequency and a set sequence, and the motor is started from a standstill status to full speed with three stages stepped frequency in the way of wave-skipping by controlling the sets of the thyristor valves to realize the maximum torque of the motor and make the motor complete the starting from the static state to full speed.

The said frequency and sequence are as follows:
When starting, 7 of the 8 half-waves in every waveform of the supply source will be selectively removed by means of the ¼f trigger signal resulting in the fundamental wave of the voltage of the motor being ¼ of the power frequency (i.e. 12.5 Hz), and the voltage steadily increasing to ¼ rated voltage, bringing about the motor starting from 0 Hz to 12.5 Hz.

When the rotation speed of the motor reaches roughly ¼ full speed, 3 of 4 half-waves in every waveform of the supply source are selectively removed, by means of ½f trigger signal, resulting in the fundamental wave frequency of the voltage and current of the motor being ½ of the power frequency, that is 25 Hz, to make the rotation speed of the motor increase in full speed from ¼ to realize the starting of the motor from 12.5 Hz to 25 Hz.

Thereafter, all of the half-waves will be applied to the motor, through the trigger signal of the power frequency, resulting in the rotation speed increasing in full speed from ½ times to realize the starting from 25 Hz-50 Hz.

The method of half-wave removed selection is that a cluster of 6 trigger signals from the control system is divided into 3 groups respectively connecting the sets of valves of the actuator, wherein each set of valves has two signals at the same time and the starting points of the signals from the adjoining two groups are at intervals of 4/3 times rated cycle. Conduction will be made in accordance with the following sequences: the $1^{st}$ set of valves SA is positive conduction and the $3^{rd}$ set of valves SC is opposite conduction simultaneously; the $2^{nd}$ set of valves SB is positive conduction and the $1^{st}$ set of valves SA is opposite conduction simultaneously; the $3^{rd}$ set of valves SC is positive conduction and the $2^{nd}$ set of valves SB is opposite conduction simultaneously, resulting in the fundamental wave frequency of AC voltage at the output end being ¼ of the rated frequency.

The cluster of 6 trigger signals from the control system is divided into 3 groups respectively connecting the sets of valves of the actuator, wherein each set of valves has two signals at the same time and the starting points of the signals from the adjoining two groups are at intervals of ⅔ times rated cycle. Conduction will be made in accordance with the following sequences: the $1^{st}$ set of valves SA is positive conduction and the $5^{th}$ set of valves SE is opposite conduction simultaneously; the $4^{th}$ set of valves SD is positive conduction and the $1^{st}$ set of valves SA is opposite conduction simultaneously; the $5^{th}$ set of valves SE is positive conduction and the $4^{th}$ set of valves SD is opposite conduction simultaneously, resulting in the fundamental wave frequency of AC voltage at the output end being ½ of the rated frequency.

Figure 2:
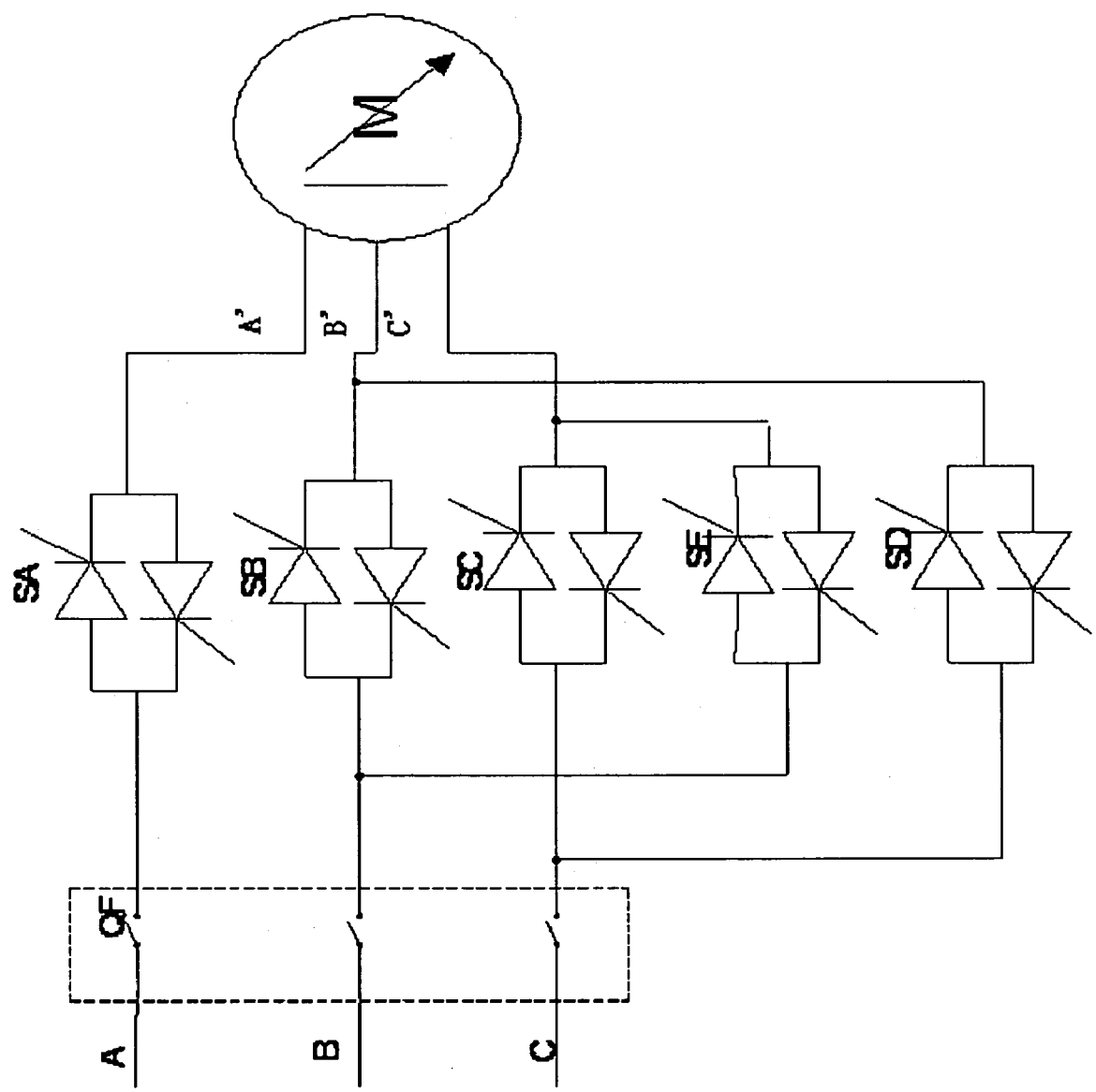
FIG. 2 is a schematic circuit of a main circuit.

The system used for the soft starting method of the present invention includes two parts of an actuator and a control device, referring to FIG. 2, wherein the actuator is the structure with five sets of anti-parallel thyristor valves. Three input ends A, B, and C of the power supply supplied by the high voltage power network connect the five sets of anti-parallel thyristor valves through a circuit breaker QF. The five sets of anti-parallel thyristor valves are positioned between the input ends A, B and C and the output ends A', B' and C' (namely, connection is made to the power supply network through the input ends A, B and C and to the motor through the output ends of A', B' and C'). The $1^{st}$ set of valves SA is connected between the power network and the motor through the $1^{st}$ input end A and the $1^{st}$ output end A'; the $2^{nd}$ set of valves SB is connected between the power network and the motor through the $2^{nd}$ input end B and the $2^{nd}$ output end B'; the $3^{rd}$ set of valves SC is connected between the power network and the motor through the $3^{rd}$ input end C and the $3^{rd}$ output end C'; the $4^{th}$ set of valves SD is connected between the $3^{rd}$ input end C and the $2^{nd}$ output end B'; and the $5^{th}$ set of valves SE is connected between the $2^{nd}$ input end B and the $3^{rd}$ output end C'.

Referring to FIG. 1, the control device consists of the micro-controller, the phase-shifting circuit and the programmable logical circuit. The phase-shifting circuit receives the synchronizing signals and the output end is linked to the micro-controller through a zero-crossing detection circuit (by adopting TN89C196KC in the present example) to transmit the synchronizing signals (after 90 degree phase-shifting). The output end of the micro-controller forwards the controlled trigger signals to the gate of the thyristors mounted in the frequency conversion starting device through a programmable logical circuit (by adopting EPM7160S in the present example) respectively. The micro-controller is also linked to a display circuit, a command input, a communications interface and a current regulating circuit.

An LCD display circuit in prior art is selected as the said display circuit in the present invention. The said command input is provided to control data (for example, the setting of the current and the selection of the starting curve etc.) via a keyboard. RS232 or RS42485 is selected as the communications interface linking to a computer or a control terminal. The current regulating circuit receives feedback signals of the motor by using a current transformer, and then provides error value compared with setting value of the keyboard as control signals for the sets of anti-parallel thyristor valves. The phase-shifting circuit, adopting a standard circuit, communicates with the micro-controller by means of the zero-crossing detection circuit. Concretely, the zero-crossing detection circuit is linked to phases B and C of the power supply through the phase-shifting circuit and two input leads. The output signals from the zero-crossing detection circuit are sent to an input channel of the micro-controller. An integrator is set in the phase-shifting circuit which has the output voltage advanced about 90 degree compared with the ends B and C of a line to line AC voltage. During the integrating processing, irregular wave, "concavity shape", in ordinary sine-wave, is removed from AC voltage waveform acting on the zero-crossing detection circuit. The output signals of the zero-crossing detection circuit change status between high level ("1") and low level ("0") while an instant value of the input voltage is beyond a zero point. Therefore, a single wave synchronizing signal SYNC corresponds to the component of the fundamental wave of VAN (i.e. AC voltage of line of phase A to neutral) in frequency and phase, and the single wave synchronizing signal (SYNC) acting on the micro-controller synchronizes with the power supply voltage.

There are 3 stages for the motor to complete starting from standstill status to full speed:

The first stage: the control device brings about ¼f trigger signals (starting signal) to act on the five sets of anti-parallel thyristor valves connected between the power supply and the motor. 7 of the 8 half-waves in every waveform of the supply source is selectively removed by means of the ¼f trigger signal resulting in the fundamental wave of the voltage of the motor being ¼ of the power frequency (i.e. 12.5 Hz), so that the voltage steadily increases to ¼ of rated voltage. This first stage will not only reduce either the starting current of the motor, or the impact to the power network, but will also maintain as much as possible the maximum torque of the motor by means of delaying the starting angle for the sets of thyristor valves. Thus, the first stage brings about the motor starting from 0 Hz to 12.5 Hz.

The second stage: in case that the rotation speed of the motor is almost up to ¼ times of full speed, the control system brings about ½f trigger signal in time. 3 of the 4 half-waves in every waveform of the supply source are then selectively removed, by means of ½f trigger signal, resulting in the fundamental wave frequency of the voltage and current of the motor being ½ of the power frequency, that is 25 Hz. Thus, the starting current at the moment is comparatively low and the impact to the power network is not much. The maximum torque of the motor is maintained as much as possible by means of regulating the starting angle of the sets of thyristor valves. The starting of the motor from 12.5 Hz to 25 Hz can be realized by increasing the rotation speed of the motor from ¼ in full speed.

The third stage: when the rotation speed of the motor is basically up to ½ times of full speed, the control system brings about the trigger signal of the full frequency (i.e. power frequency). In this moment, none of the half-waves of the waveforms will be removed and all of the half-waves will be applied to the motor. The rotation speed of the motor begins to increase from ½ times in full speed. This realizes the starting of the motor from 25 Hz to 50 Hz. After a period of time, the rotation speed can be up to or close to full speed.

By the foregoing, the motor will have completed the procedure of acceleration from a static state to full speed through the three stages of acceleration from 0 Hz to 12.5 Hz, 12.5 Hz to 25 Hz and 25 Hz to 50 Hz. At the completion of the acceleration, all the thyristor groups are closed and the sets of thyristor valves are short-circuited by a by-pass contactor and then the trigger pulse of the sets of thyristor valves are placed in an off-state. Thereby, a disturbance-free switchover from mode of starting to mode of operation is finished resulting in the motor achieving a status of rated rotation-speed operation.

In addition, the starting device provides three modes of stopping the motor.

The $1^{st}$ mode is of free stopping. In this mode, the control device shuts off all sets of valves to obtain the free stopping in the status of no power. In this mode, the motor often requires a very long period of time to stop in the condition of larger inertia.

The 2nd is of soft stopping. In this mode, the control device acts on the motor with the frequencies from 50 Hz to 25 HZ, 25 Hz to 12.5 HZ, and 12.5 Hz to 0 Hz, in accordance with the sequence opposite to the starting procedure. This mode requires shorter time than the 1st mode does.

The 3rd mode is of electrical-brake stopping. In this mode, the control device brings about DC component to the voltage waveform applied to the motor and controls the torque and the braking current by means of controlling the conduction angle of the sets of valves. A quick stopping can be realized by this mode.

In general, the technology in this invention can bring up the starting torque to over 10 times that of traditional motor soft starting through voltage-reduction, and the starting current is held at about 2 times of the rated current. In addition, the cost is only 20-25% of the frequency converter.

Example 2

The soft starting method in the way of wave-skipping with stepped frequency and stepless voltage regulating for a motor can be applied to a circumstance which requires only two stages of the stepped starting (¼f and full frequency) to meet the demand of starting. In FIG. 2, the sets of thyristor valves SD and SE can be removed, with the sets of thyristor valves SA, SB and SC remaining.

Figure 3:
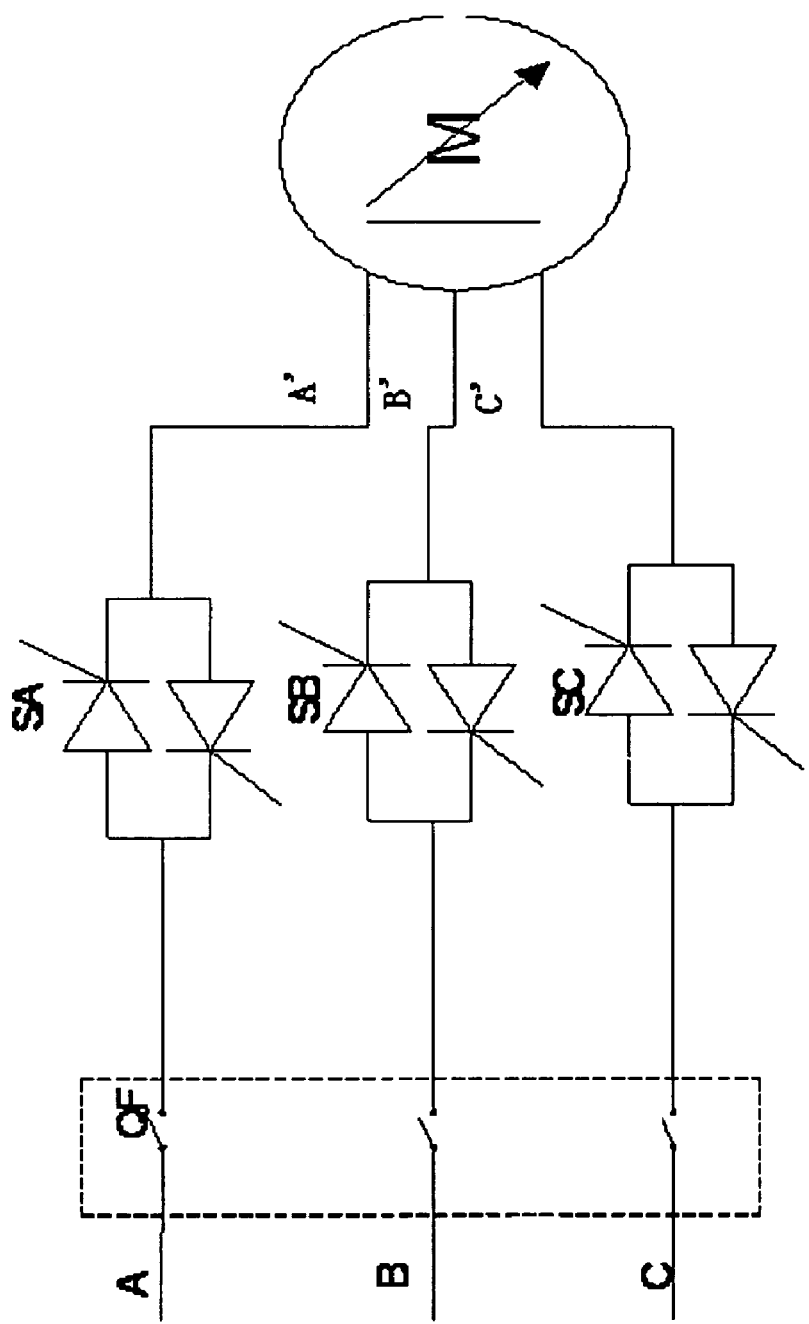
FIG. 3 is a schematic circuit of Example 2.

Referring to FIG. 3, the connecting relation of the circuits is: three input ends of power supply A, B and C are energized by the high-voltage power network and the three sets of anti-parallel thyristor valves are connected between the input ends A, B and C and the output ends A', B' and C'. The 1st set of valves SA is connected between the 1st input end A and the 1st output end A'; the 2nd set of valves SB is connected between the 2nd input end B and the 2nd output end B'; the 3rd set of valves SC is connected between the power network and the motor through the 3rd input end C and the 3rd output end C'.

The method of removed selection is as follows: a cluster of 6 trigger signals from the control system is divided into 3 groups respectively connecting the sets of valves of the actuator, wherein each set of valves has two signals at the same time and the starting points of the signals from the adjoining two groups are at intervals of ⅔ times rated cycle. Conduction will be made in accordance with the following sequences: the 1st set of valves SA is positive conduction and the 3rd set of valves SC is opposite conduction simultaneously; the 2nd set of valves SB is positive conduction and the 1st set of valves SA is opposite conduction simultaneously; the 3rd set of valves SC is positive conduction and the 2nd set of valves SB is opposite conduction simultaneously, resulting in the fundamental wave frequency of AC voltage at the output end being ¼ of the rated frequency.

We claim:

1. A soft starting method in the way of wave-skipping with stepped frequency and stepless voltage regulating for a motor, wherein:

trigger signals generated by a control system act on five sets of anti-parallel thyristor valves connected between a power supply and the motor to conduct a pair of thyristors thereof according to a set frequency and a set sequence, and the motor is started from a standstill status to full speed in the way of wave-skipping by controlling the sets of the thyristor valves to realize the maximum torque of the motor, and make the motor complete the starting from a static state to full speed, wherein setting the frequency and sequence includes:

firstly, while starting, 7 of the 8 half-waves in every waveform of the supply source will be selectively removed by means of a ¼f trigger signal, resulting in the fundamental wave of the voltage of the motor being ¼ of the power frequency, and the voltage steadily increasing to ¼ a rated voltage, to realize the motor starting from 0 Hz to 12.5 Hz;

secondly, 3 of 4 half-waves in every waveform of the supply source are selectively removed, by means of a ½f trigger signal, resulting in the fundamental wave frequency of the voltage and current of the motor being ½ of the power frequency, to make the rotation speed of the motor increase in full speed from ¼, to realize the motor starting from 12.5 Hz to 25 Hz; and thirdly, applying all of the half-waves of the supply source to the motor, through the trigger signal of the power frequency, resulting in the rotation speed increasing in full speed from ½ to realize the motor starting from 25 Hz-50 Hz;

wherein the method of half-wave removal selection includes:

a step (1) of: dividing a cluster of 6 trigger signals from the control system into 3 groups respectively connecting the sets of valves of the actuator, wherein each set of valves has two signals at the same time, the starting points of the signals from the adjoining two groups are at intervals of 4/3 times a rated cycle, and conduction is in accordance with the following sequences: a first 1st set of valves is in positive conduction and a 3rd set of valves is in opposite conduction simultaneously; a 2nd set of valves is in positive conduction and the 1st set of valves is in opposite conduction simultaneously; and the 3rd set of valves is in positive conduction and the 2nd set of valves is in opposite conduction simultaneously, and the fundamental wave frequency of AC voltage at the output end is made to be approximately ¼ of a rated frequency; and a step (2) of: the cluster of 6 trigger signals from the control system is divided into 3 groups respectively connecting the sets of valves of the actuator, wherein each set of valves has two signals at the same time, the starting points of the signals from the adjoining two groups are at intervals of ⅔ times rated cycle, and conduction is in accordance with the following sequences: a 1st set of valves is in positive conduction and a 5th set of valves is in opposite conduction simultaneously; a 4th set of valves is in positive conduction and the 1st set of valves is in opposite conduction simultaneously; the 5th set of valves is in positive conduction and the 4th set of valves is in opposite conduction simultaneously, and the fundamental wave frequency of AC voltage at the output end is made to be approximately ½ of a rated frequency.

2. A system configured for using the soft starting method in the way of wave-skipping with stepped frequency and stepless voltage regulating for the motor according to claim 1, comprising an actuator and a control device, wherein the actuator includes a plurality of sets of thyristor valves, with two thyristors from each set of thyristor valves forming an anti-parallel group, connecting between the power supply and the motor.

3. The system configured for using the soft starting method in the way of wave-skipping with stepped frequency and stepless voltage regulating for the motor according to claim 2, wherein the connections include: a 1st set of valves connected between the power network and the motor through a 1st input end and a 1<sup>st</sup> output end; a 2<sup>nd</sup> set of valves connected between the power network and the motor through a 2<sup>nd</sup> input end and a 2<sup>nd</sup> output end; and a 3<sup>rd</sup> set of valves connected between the power network and the motor through a 3<sup>rd</sup> input end and a 3<sup>rd</sup> output end.

4. The system configured for using the soft starting method in the way of wave-skipping with stepped frequency and stepless voltage regulating for the motor according to claim 2, wherein the control device consists of comprises:
  a micro-controller;
  a phase-shifting circuit; and
  a programmable logical circuit, wherein
    the phase-shifting circuit is configured to receive synchronizing signals and includes an output end linked to the micro-controller by a zero-crossing detection circuit configured to transmit synchronizing signals after a 90 degree phase-shifting,
    an output end of the micro-controller is configured to forward controlled trigger signals to a gate of the thyristors mounted in the frequency conversion starting device through the programmable logical circuit; and
    the micro-controller is linked to a display circuit, a command input, a communication interface and a current regulating circuit.

5. A system configured for using a soft starting method in the way of wave-skipping with stepped frequency and stepless voltage regulating for a motor, characterized in that:
  the method includes:
    trigger signals generated by a control system act on five sets of anti-parallel thyristor valves connected between a power supply and the motor to conduct a pair of thyristors thereof according to a set frequency and a set sequence, and
    the motor is started from a standstill status to full speed in the way of wave-skipping by controlling the sets of the thyristor valves to realize the maximum torque of the motor, and make the motor complete the starting from a static state to full speed, and the system comprises:
      an actuator and a control device, wherein
      the actuator includes a plurality of sets of thyristor valves, with the two thyristors from each set of thyristor valves forming an anti-parallel group, connecting between the power supply and the motor, and
      the connections include: a 1<sup>st</sup> set of valves connected between the power network and the motor through a input end and a 1<sup>st</sup> output end; a 2<sup>nd</sup> set of valves connected between the power network and the motor through a 2<sup>nd</sup> input end and a 2<sup>nd</sup> output end; a 3<sup>rd</sup> set of is valves connected between the power network and the motor through a 3<sup>rd</sup> input end and a 3<sup>rd</sup> output end; a 4<sup>th</sup> set of valves connected between the 3<sup>rd</sup> input end and the 2<sup>nd</sup> output end; and a 5<sup>th</sup> set of valves connected between the 2<sup>nd</sup> input end and the 3<sup>rd</sup> output end.

6. A soft starting method in the way of wave-skipping with stepped frequency and stepless voltage regulating for a motor, wherein:
  trigger signals generated by a control system act on five sets of anti-parallel thyristor valves connected between a power supply and the motor to conduct a pair of thyristors thereof according to a set frequency and a set sequence, and
  the motor is started from a standstill status to full speed in the way of wave-skipping by controlling the sets of the thyristor valves to realize the maximum torque of the motor, and make the motor complete the starting from a static state to full speed,
  wherein setting the frequency and sequence includes:
    firstly, while starting, selectively removing half-waves in a waveform of the supply source by means of a ¼f trigger signal, making the fundamental wave of the voltage of the motor become ¼ of the power frequency, and making the voltage steadily increase to ¼ rated voltage, to realize the motor starting from 0 Hz to 12.5 Hz;
    secondly, selectively removing half-waves in the waveform of the supply source, by means of a ½f trigger signal, making the fundamental wave frequency of the voltage and current of the motor become ½ of the power frequency, to making the rotation speed of the motor increase in full speed from ¼, to realize the motor starting from 12.5 Hz to 25 Hz; and
    thirdly, applying all of the half-waves of the waveform of the supply source to the motor, through the trigger signal of the power frequency, making the rotation speed increase in full speed from ½, to realize the motor starting from 25 Hz-50 Hz;
  wherein the method of half-wave removal selection includes:
    a step (1) of: dividing a cluster of 6 trigger signals from the control system into 3 groups respectively connecting the sets of valves of the actuator, wherein each set of valves has two signals at the same time, the starting points of the signals from the adjoining two groups are at intervals of a rated cycle, and conduction is in accordance with the following sequences: a first 1<sup>st</sup> set of valves is in positive conduction and a 3<sup>rd</sup> set of valves is in opposite conduction simultaneously; a 2<sup>nd</sup> set of valves is in positive conduction and the 1<sup>st</sup> set of valves is in opposite conduction simultaneously; and the 3<sup>rd</sup> set of valves is in positive conduction and the 2<sup>nd</sup> set of valves is in opposite conduction simultaneously, and the fundamental wave frequency of AC voltage at the output end is made to be approximately ¼ of a rated frequency; and
    a step (2) of: the cluster of 6 trigger signals from the control system is divided into 3 groups respectively connecting the sets of valves of the actuator, wherein each set of valves has two signals at the same time, the starting points of the signals from the adjoining two groups are at intervals of a rated cycle, and conduction is in accordance with the following sequences: a 1<sup>st</sup> set of valves is in positive conduction and a 5<sup>th</sup> set of valves is in opposite conduction simultaneously; a 4<sup>th</sup> set of valves is in positive conduction and the 1<sup>st</sup> set of valves is in opposite conduction simultaneously; the 5<sup>th</sup> set of valves is in positive conduction and the 4<sup>th</sup> set of valves is in opposite conduction simultaneously, and the fundamental wave frequency of AC voltage at the output end is made to be approximately ½ of a rated frequency.

7. A system configured for using the soft starting method in the way of wave-skipping with stepped frequency and stepless voltage regulating for the motor according to claim 6, comprising an actuator and a control device, wherein the actuator includes a plurality of sets of thyristor valves, with two thyristors from each set of thyristor valves forming an anti-parallel group, connecting between the power supply and the motor.

8. The system configured for using the soft starting method in the way of wave-skipping with stepped frequency and stepless voltage regulating for the motor according to claim 7, wherein the connections include: a $1^{st}$ set of valves connected between the power network and the motor through a $1^{st}$ input end and a $1^{st}$ output end; a $2^{nd}$ set of valves connected between the power network and the motor through a $2^{nd}$ input end and a $2^{nd}$ output end; and a $3^{rd}$ set of valves connected between the power network and the motor through a $3^{rd}$ input end and a $3^{rd}$ output end.

9. The system configured for using the soft starting method in the way of wave-skipping with stepped frequency and stepless voltage regulating for the motor according to claim 7, wherein the control device comprises:

a micro-controller;
a phase-shifting circuit; and
a programmable logical circuit, wherein the phase-shifting circuit is configured to receive synchronizing signals and includes an output end linked to the micro-controller by a zero-crossing detection circuit configured to transmit synchronizing signals after a 90 degree phase-shifting, an output end of the micro-controller is configured to forward controlled trigger signals to a gate of the thyristors mounted in the frequency conversion starting device through the programmable logical circuit, and the micro-controller is linked to a display circuit, a command input, a communication interface and a current regulating circuit.

* * * * *